US007004446B2

(12) United States Patent
Petro et al.

(10) Patent No.: US 7,004,446 B2
(45) Date of Patent: Feb. 28, 2006

(54) BISTABLE DUAL-MAGNET VALVE UNIT

(76) Inventors: John P. Petro, 1305 McKenzie Ave., Los Altos, CA (US) 94024; Donald Burch, 218 Mt. Hamilton Ave., Los Altos, CA (US) 94022; Jeremy F. Mayer, 541 Prospect Pl., #R, San Mateo, CA (US) 94401

( * ) Notice: Subject to any disclaimer, the term of this patent is extended or adjusted under 35 U.S.C. 154(b) by 262 days.

(21) Appl. No.: 10/245,252

(22) Filed: Sep. 16, 2002

(65) Prior Publication Data

US 2004/0051065 A1    Mar. 18, 2004

(51) Int. Cl.
*F16K 31/143*    (2006.01)
(52) U.S. Cl. .................................................... 251/63.4
(58) Field of Classification Search ............. 251/63.4, 251/62, 65
See application file for complete search history.

(56) References Cited

U.S. PATENT DOCUMENTS

| | | | |
|---|---|---|---|
| 3,212,751 A | | 10/1965 | Hassa |
| 3,273,091 A | | 9/1966 | Wales, Jr. |
| 3,950,719 A | | 4/1976 | Maxwell |
| 4,403,765 A | * | 9/1983 | Fisher ......................... 251/65 |
| 4,489,297 A | | 12/1984 | Haydon et al. |
| 4,637,427 A | * | 1/1987 | Nolan et al. ................ 137/460 |
| 4,851,800 A | | 7/1989 | Peterson et al. |
| 4,940,207 A | | 7/1990 | Katsuyama |
| 5,320,136 A | * | 6/1994 | Morris et al. ............... 137/528 |
| 5,434,549 A | | 7/1995 | Hirabayashi et al. |
| 6,501,357 B1 | | 12/2002 | Petro |

FOREIGN PATENT DOCUMENTS

| | | | |
|---|---|---|---|
| EP | 0436214 | | 7/1991 |
| FR | 2689201 | * | 1/1993 |
| JP | 03177673 | | 8/1991 |

* cited by examiner

*Primary Examiner*—David J. Walczak
(74) *Attorney, Agent, or Firm*—Richard Esty Peterson

(57) ABSTRACT

A dual-magnet valve unit having a first master magnet ring assembly with an outer casing slidably contained within an outer housing that forms a chamber with the casing of the master magnet ring assembly and a second, slave magnet disk assembly with an outer tube and a poppet member in the form of a cone and displaceable within the inner transport fluid conduit, the inner transport fluid conduit having a valve seat contactable by the cone of the poppet member to block fluid flow through the fluid conduit in one position of the slave magnet disk assembly and displaceable from the cone to pass fluid flow through the fluid conduit in an opposite position of the slave magnet disk assembly, the master magnet ring assembly being displaced by selective supply of a motive fluid to the chamber to displace the master magnet ring assembly from one position to another, which automatically displaces the slave magnet ring assembly.

16 Claims, 6 Drawing Sheets

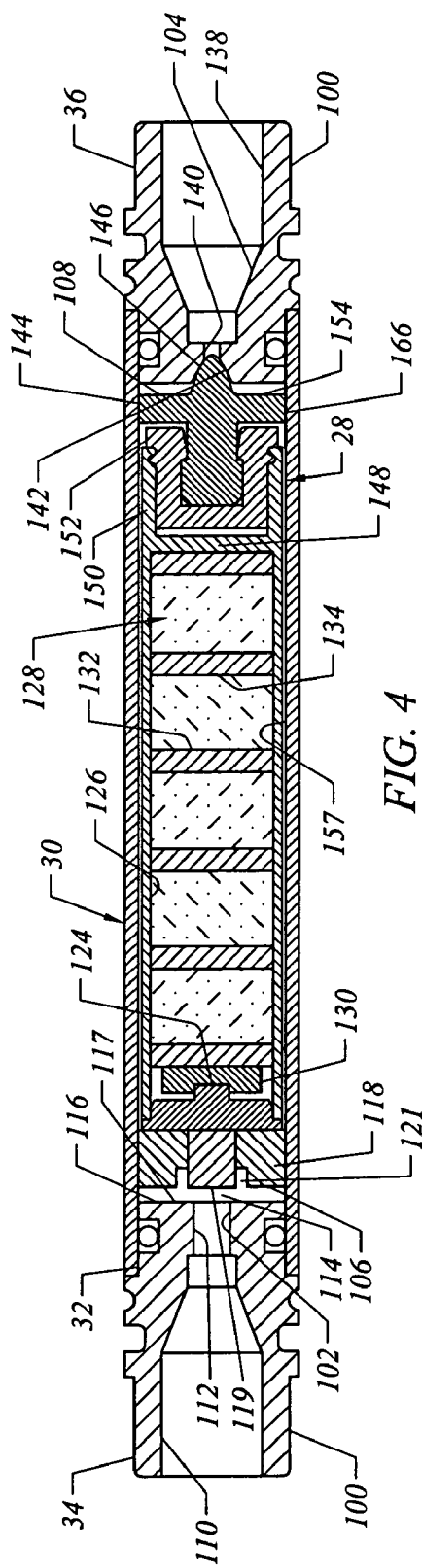
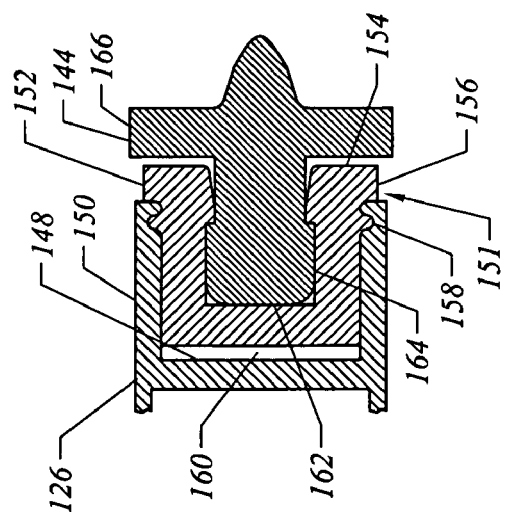
FIG. 4
FIG. 4A

BISTABLE DUAL-MAGNET VALVE UNIT

BACKGROUND OF THE INVENTION

This invention relates to a permanent magnet actuator mechanism of the type described in my U.S. application Ser. No. 09/802,423 filed Mar. 9, 2001. In particular, the subject matter of this application relates to a valve unit having a permanent magnet actuator mechanism for displacement of a valve member between an open position and a closed position. The dual-magnet valve unit of this invention is fluid driven and includes an outer casing or housing such that the valve unit is a compact, self-contained unit that can be incorporated in a variety of applications requiring an on-off valve.

In operation, a first permanent magnet member co-acts with a second permanent magnet member in a master/slave relationship. The permanent magnet members in certain embodiments are positioned with the magnet members in mutual magnetic repulsion wherein displacement of one of the permanent magnet members automatically effects opposite displacement of the other of the permanent magnet members. In displaceable embodiment the magnet members are positioned in mutual attraction wherein displacement of one of the permanent magnet members automatically effects displacement of the other of the permanent magnet members in the same direction.

In a basic system the use of mutually displaceable permanent magnet members enables one of the permanent magnet members to be isolated by a barrier from the other permanent magnet member. This relationship is ideal where it is desired to isolate a fluid or gas from external contamination. In such a situation the displaceable valve member may be contained in a fluid conduit and magnetically displaced by the displacement of an external permanent magnet member external to the fluid conduit.

SUMMARY OF THE INVENTION

The dual-magnet valve unit of this invention incorporates certain of the concepts described in U.S. patent application Ser. No. 709/802,423, filed Mar. 9, 2001.

In the referenced application there is described an embodiment of a valve with an isolated slidable spool carried on one magnet member that is displaced on displacement of another magnet member. The second magnet number is separated from the first magnet member by a wall of a conduit in which the fluid to be regulated is transported. Each of the two magnet members is preferably an assembly of permanent magnets and pole pieces configured and arranged within a containment structure to maintain a magnetic repulsion that is effected dynamically on translocation of the magnet members.

In the valve embodiment of the referenced application, the prime mover to effect the translocation is an electromagnetic coil system. The coil system on activation is designed to generate a magnetic field to interact with the magnetic field of the second or outer magnet member to shift the magnet member and hence automatically displace the magnetic spool member in an opposite direction. The coil system is designed to allow this process to be reversed to return the magnetic spool member to its first position. When the spool member is located in one position or the other, no energy is required in the coil system to maintain the spool member in position.

As noted in the referenced description, other means may be employed as the prime mover. In many industrial environments, hydraulic or pneumatic control systems are available as a means to control or regulate components of system processes. Use of a fluid medium to actuate the dual-magnet unit of this invention enables a compact, relatively inexpensive valve unit to be constructed. The unit described in this application is adapted to include springs, if desired. However, typically in a fluid actuated unit, the power necessary to displace the master magnet member is readily available, and refinements in the force profile by use of springs is generally not necessary.

In translocation of the magnet members, substantial momentum is generated even though the distances of displacement are relatively small. When applied as a valve unit, the valve member displaces to a closure position and contacts a valve seat. The permanent magnets and poles forming the dis placeable spool member add a substantial mass that results in a significant momentum that must be dissipated on impact on the valve seat. In certain embodiments of this invention, the valve unit is improved by a spool design in the form of a poppet plunger having an integral shock absorber to absorb the repeated impact on each closure of the valve.

Translocation of the magnet members is preferred in a system where the prime mover is an electromagnetic coil system. Use of a coil system to maintain and not simply switch the position of the master magnet member is preferably avoided to prevent burn-out of the coil.

In a fluid activated system where the pressure of a motive fluid is continuously available, the master magnet member can be maintained in one of the two positions by use of the continuously available fluid pressure. In this situation magnetic attraction of the outer magnet member and inner magnet member can be used with codirectional location of the magnet members. To optimize the magnetic attraction to achieve the force of positioning of the slave member, particularly on closure of the valve, the master magnet member must be maintained at its stop position by the drive fluid. One advantage to this arrangement is that the slave member follows this master member and avoids the impact of automatic translocation in a repulsion system. In this manner, the complex shock absorber can be omitted.

In addition, other features are provided including containment structures for the magnet and pole assemblies which alternately are permanently sealed by welding or sealed with static O-rings for disassembly. Additionally, novel configurations of the pole pieces are designed to facilitate assembly and improve the magnetic coupling force.

The improved dual-magnet valve unit is provided with a cam operated indicator to provide a visual check of the valve state to determine if the valve is open or closed. In this embodiment, there is also provided a mounting base with coupling terminals for the fluid lines of the motive fluid that actuates the displacement of the master magnet member. Furthermore, by selective design of a constricted passage for the supply of the motive fluid, the speed of actuation of the master magnet member can be controlled and tailored for different applications.

The improved dual-magnet valve unit of this invention utilizes low cost cylindrical parts for the housing, which forms a chamber for the encased master magnet member to be displaced in the manner of a piston by selective supply of motive fluid. The motive fluid can be liquid or gas and the unit is particularly adapted to operate with pneumatic air systems common to industrial processing operations. The dual-magnet valve unit of this invention is designed as a general application valve unit where the transported fluid must be accurately measured and/or must be free from external contamination.

In the embodiments described, the first and second magnet members are each an assembly of five or six magnets. It is to be understood that the number of permanent magnets, and hence pole pieces, may vary according to the application and closure force needed for a particular pressure of the transport fluid.

These and other features are apparent from a consideration of the detailed description of the preferred embodiments.

BRIEF DESCRIPTION OF THE DRAWINGS

FIG. 4 is a cross-sectional view of the transport fluid conduit assembly and inner magnet disk assembly of the dual-magnet valve unit of FIG. 2.

FIG. 4A is an enlarged view of part of the magnetic disk assembly of FIG. 4.

FIG. 5 is a perspective view of the plunger stop element of the dual-magnet valve unit of FIG. 2.

FIG. 6 is a perspective view of the poppet member of the dual-magnet valve unit of FIG. 2.

FIG. 7 is a perspective view of a second embodiment of the dual-magnet valve unit.

DETAILED DESCRIPTION OF THE PREFERRED EMBODIMENTS

Figure 1:
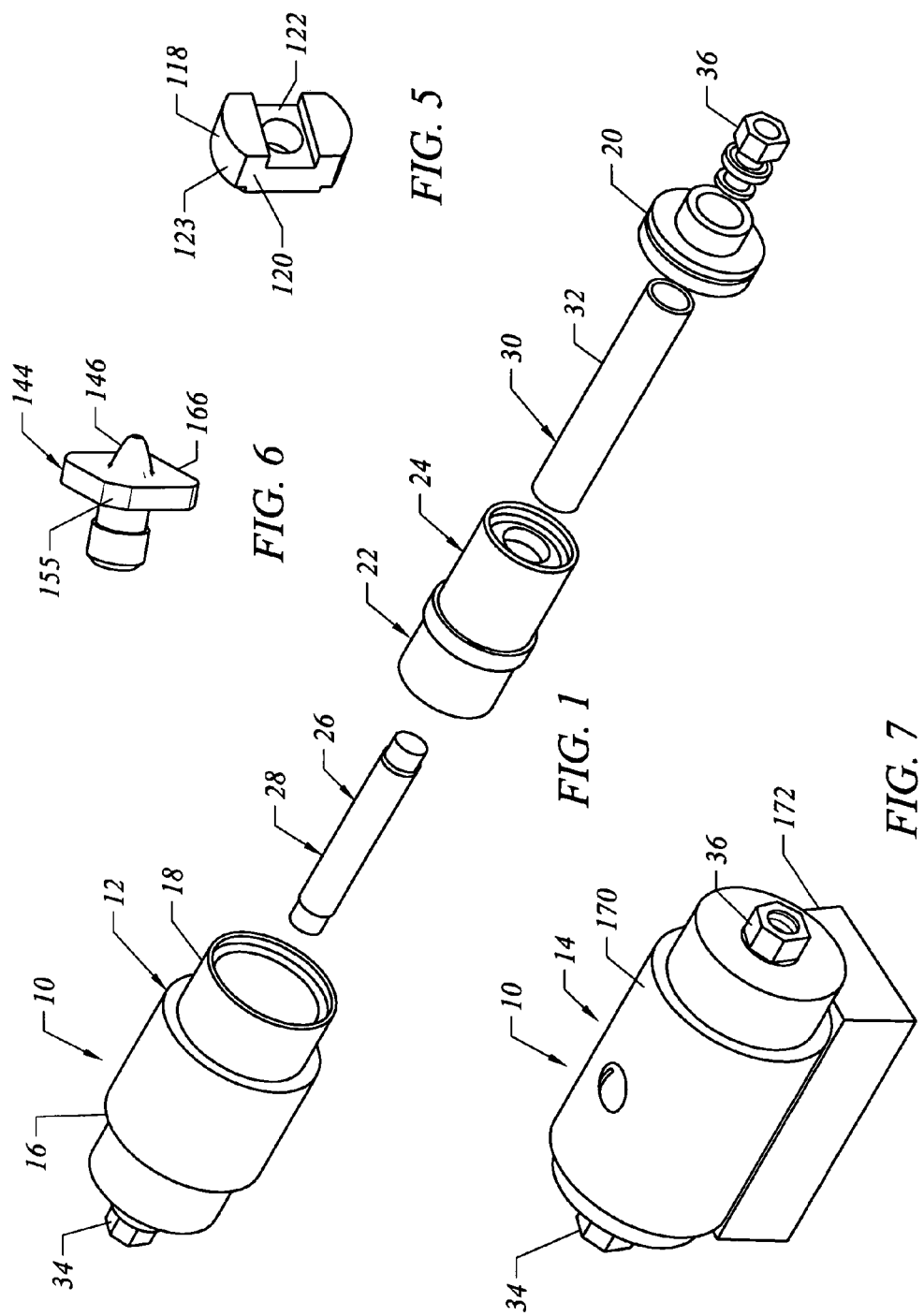
FIG. 1 is an exploded view of a first embodiment of the dual-magnet valve unit of this invention.

The fluid driven, dual-magnet valve unit of this invention, is designated generally by the reference numeral 10. A first basic embodiment of the dual-magnet valve unit 10 is described with reference to FIGS. 1–4 and is identified by the reference numeral 12. A second mountable embodiment of the dual-magnet valve unit 10 is described with reference to FIGS. 7 and 8 and is identified by the numeral 14. A third embodiment of the dual-magnet valve unit 10 that utilizes magnetic attraction, and is described with reference to FIG. 9 and is identified by the reference numeral 250.

Referring to the exploded view of FIG. 1, the basic bistable dual-magnet valve unit 12 has a containment housing 16 comprising an outer casing 18 with a removable end cap 20. The outer casing 18 and end cap 20 contain a displaceable first magnet member 22 comprising an outer magnet ring assembly 24 and a displaceable second magnet member 26 comprising an inner magnet disk assembly 28.

Isolating the annular outer magnet ring assembly 24 from the cylindrical inner magnet disk assembly 28 is a transport fluid conduit assembly 30. The transport fluid conduit assembly 30 comprises a high pressure cylindrical tube 32 having first and second specialized end fittings 34 and 36, which provide for connection of conventional fittings of a fluid line (not shown) for the controlled fluid transported through the dual magnet actuator unit. It is to be understood that the controlled transport fluid is the liquid or gas that is regulated by the bistable valve unit of this invention and differs from the drive fluid which is a liquid or gas that is employed as the pressure medium that comprises the external prime mover for actuating the valve unit.

The transport fluid conduit assembly 30 contains the second inner magnet disk assembly 28 and isolates the transport fluid from the first outer magnet ring assembly 24 and prevents the transport fluid from contact with or contamination by the drive fluid. For example, the pressurized drive fluid comprises air in a pneumatic system that actuates the valve unit for a liquid in a processing system where the liquid flow is required to start and stop. As noted in the referenced patent application, the hermetically isolated inner magnet disk assembly acting as a valve poppet does not affect the volume of the transport fluid unlike a typical globe valve or gate valve where the valve stem enters into and withdraws from the transport fluid during closing and opening of such valves.

Figure 2:
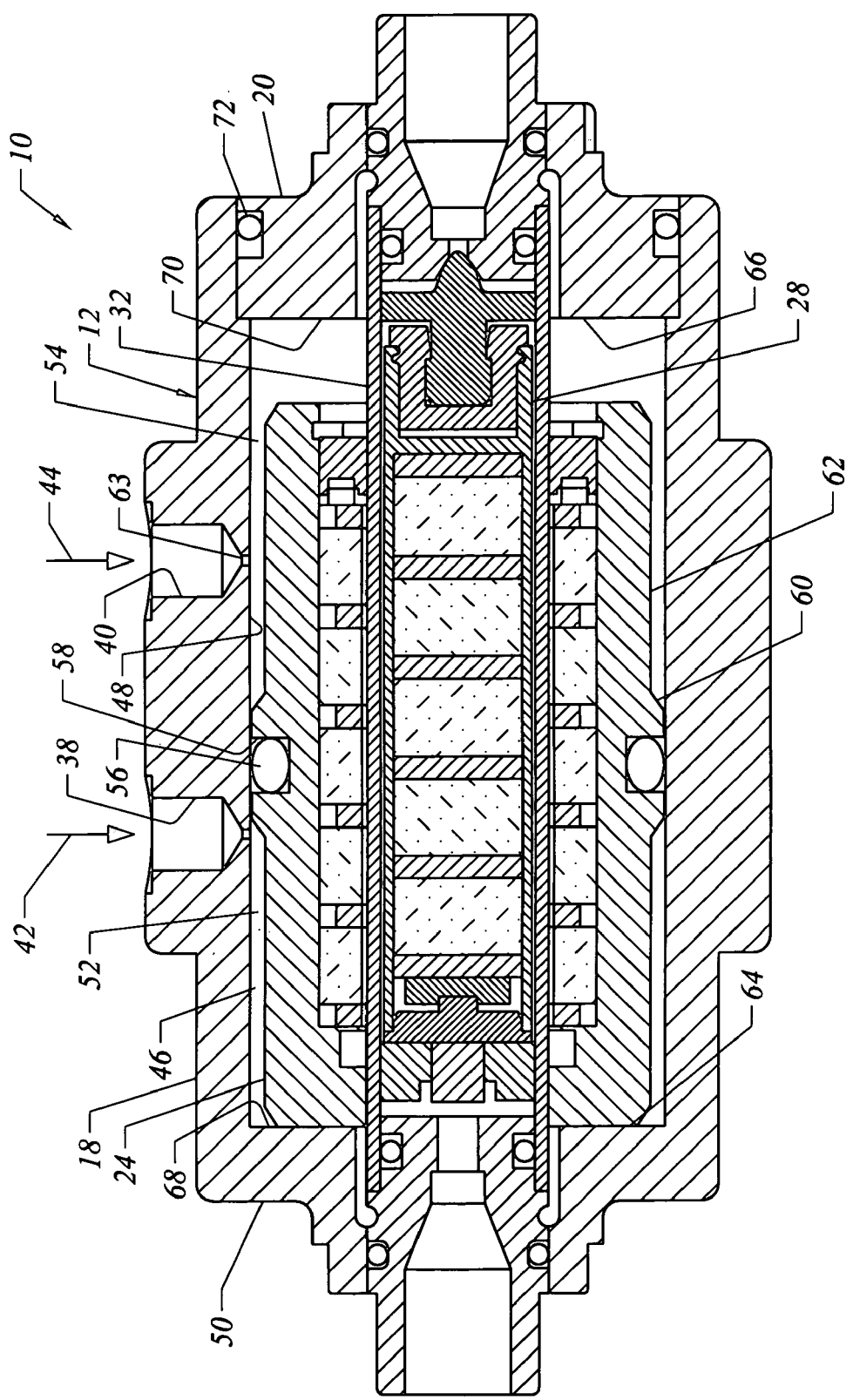
FIG. 2 is a cross-sectional view of the dual-magnet valve unit of FIG. 1.

Referring in addition to FIG. 2, the cross-sectional view of the basic dual-magnet valve unit 12 illustrates the assembled components which are substantially symmetrical about a common axis. The outer casing 18, however, has side entry ports 38 and 40 for connection of conventional fittings (not shown) for the drive fluid supply lines 42 and 44.

The supply of the pressurized drive fluid is regulated by a conventional control system for selective delivery of a pressurized drive fluid to one of the two entry ports 38 and 40 for displacement of the outer magnet ring assembly 24 in an annular chamber 46. The annular chamber is defined by the inner wall 48 of the outer casing 18, a unitary containment end 50 of the outer casing 18, the removable casing end cap 20 and the cylindrical tube 32 of the conduit assembly 30.

The annular chamber 46 is effectively divided into two compartments 52 and 54 by an O-ring seal 56 that seats in a groove 58 in a raised perimeter seal seat 60 in a casing 62 of the outer magnet ring assembly 24. The entry ports 38 and 40 communicate with the compartments 52 and 54, respectively, by a constricted passage 63, which is sized to control the speed of actuation. Other valving in the drive fluid control system may provide an alternate means of controlling the actuation as desired.

The outer magnet ring assembly 24 functions in the manner of a floating piston between end stops 64 and 66. The end stops 64 and 66 limit the displacement of the outer magnet ring assembly 24 and are formed by the inside wall 68 of the containment end 50 of the outer casing 18 and the inside wall 70 of the end cap 20.

In operation, when the pressurized drive fluid is admitted through port 40 with pressure in port 38 relieved, the outer magnet ring assembly 24 is driven to the inside wall 68 of the containment end 50 of the outer casing 18 as shown in FIG. 2. Notably, the inner magnet disk assembly 28 is automatically driven by magnetic repulsion to its displacement limit in the opposite direction. When the pressurized drive fluid is admitted through port 38 with pressure in port 40 relieved, the outer magnet ring assembly 24 is driven to the opposite stop 66 against the inside wall 70 of the end cap 20. Again, by magnetic repulsion the inner magnet disk assembly 28 is automatically displaced to its opposite displacement limit.

The removable end cap 20 permits installation of the outer magnet ring assembly 24 and may be press-fit to the outer casing 18 with an O-ring seal 72 as shown, or secured by threading, or alternately by soldering, brazing or welding for a permanent assembly.

Figure 3:
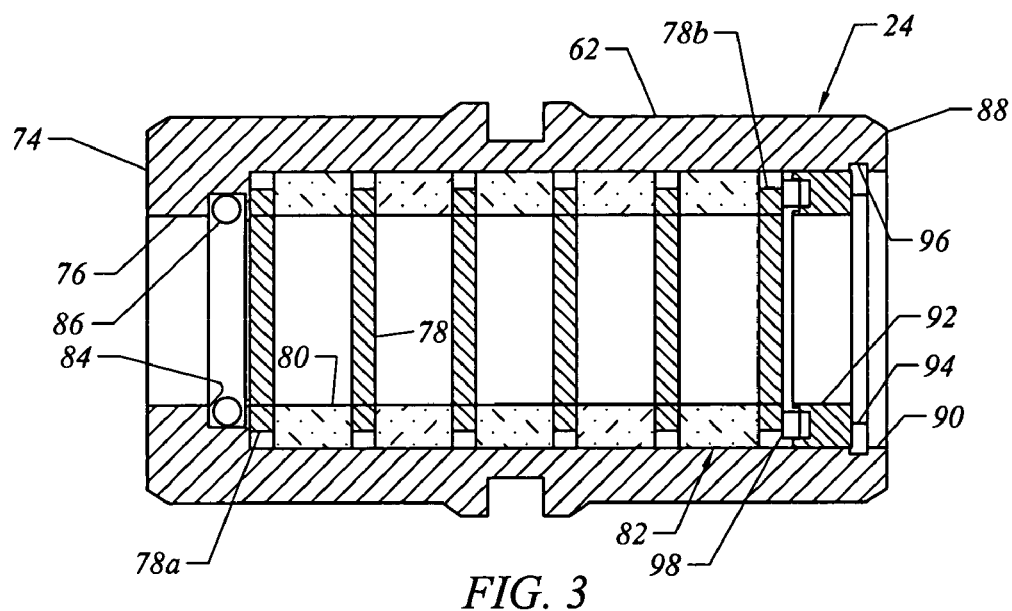
FIG. 3 is a cross-sectional view of the outer magnet ring assembly of the dual-magnet valve unit of FIG. 2.

Referring also to FIG. 3, the annular casing 62 of the outer magnet ring assembly 24 has a first end 74 with a circular opening 76 sufficiently large to slidably engage the high pressure cylindrical tube 32 of the transport fluid conduit assembly 30 and sufficiently small to seat a first ring pole 78a of the six alternating ring poles 78 and five ring magnets 80 of the magnet subassembly 82 of the outer magnet ring assembly 24. The opening 76 has an internal groove 84 to seat an O-ring seal 86 for sealing the magnet subassembly 82 from the drive fluid contained in the annular chamber 46.

It is to be understood that the O-ring seals used in the bistable dual-magnet valve unit 10 may be replaced with other seals or packings depending on the application of the unit. Also, as noted certain seals may be eliminated where components are permanently joined by soldering, brazing or welding.

The opposite end 88 of the casing 62 of the outer magnet ring assembly 24 has a circular opening 90 sized to permit installation of the ring poles 78 and ring magnets 80. The magnet subassembly 82 is retained by an annular end cap 92 and retainer clip 94 that seats in a groove 96 in the opening 90. A spacer 98 between the end cap 92 and the end ring pole 78b is sized to clamp together the ring poles 78 and ring magnets 80 of the subassembly 82 on assembly.

Figure 3A:
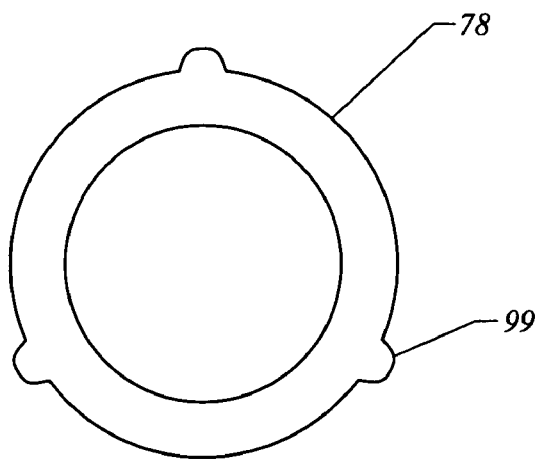
FIG. 3A is an end view of a ring pole in the outer magnet ring assembly of FIG. 3.

To facilitate assembly and improve the magnetic flux directed at the inner magnet disk assembly 28, the ring poles 78 have a slightly smaller inside diameter than the ring magnets 80 and include radial ears 99 as shown in FIG. 3A.

Referring also to FIG. 4, the transport fluid conduit assembly 30 and contained inner magnet disk assembly 28 are shown in cross section without the other components for clarity. The specialized end fittings 34 and 36 at opposite ends of the high pressure tube 32 have an external hex head portion 100 for gripping with a wrench when connecting the carrier fluid line when installing the dual-magnet valve unit 10 in a system. This portion of the end fittings 34 and 36 can be tailored for the type of connector required for the carrier fluid line.

The end fittings 34 and 36 have differing internal portions 102 and 104 to accommodate the different functional ends 106 and 108 of the inner magnet disk assembly 28.

The end fitting 34 has an internal fluid passage 110 that has a constricted internal port 112 to the internal chamber 114 of the fluid transport conduit assembly 30. The blunt internal end face 116 forms a stop 117 for a corresponding plunger stop element 118. As shown in the perspective view of FIG. 5, the plunger stop element 118 is in the form of a truncated cylindrical disk with chordal side faces 120, and a gap 122 that forms a fluid by-pass 121. Curved side faces 123 provide a slide guide for the displacement in the cylindrical tube 32 of the conduit assembly 30. The plunger stop element 118 is secured on a post 119 of an end cap 124 that is connected to a cylindrical plunger casing 126 for containing the inner magnet subassembly 128 of the inner magnet disk assembly 28. The assembled inner magnet disk assembly 28 forms a poppet plunger.

The magnet subassembly 128 has a spacer 130 at the end of an alternating series of disk poles 132 and disk magnets 134. The plunger casing 126 is spaced from the high pressure tube 32 of the conduit assembly 30 to provide transport for fluid flow and this creates part of the gap between the outer magnet subassembly 82 and the inner magnet subassembly 128. The series of six disk poles 132 and five disk magnet 134 are arranged for magnetic repulsion with the ring poles 78 and ring magnets 80 of the outer magnet subassembly 82 as taught in the referenced patent application.

The end fitting 36 has the internal portion 104 formed with an internal passage 138 having a constricted port 140 with a flared or conical valve seat 142. The inner magnet disk assembly 28 has a poppet member 144 with a specially formed cone 146, shown in the perspective view of FIG. 6. The cone 146 preferably has the cross-sectional configuration of a gothic arch for strength and durability. The cone 146 provides the complimentary seating member for the valve seat 142 when the inner magnet disk assembly 28 operates as a poppet plunger and is displaced by magnetic force against the end fitting 36. This force is maintained by the mutual magnetic repulsive forces and the cone 146 seats forcefully on the valve seat 142 to seal the internal passage 138.

The plunger casing 126 is constructed similar to a shell casing with a unitary base 148 recessed from an end portion 150 that provides a socket for a shock absorber 151 as shown in greater detail in the enlarged view of FIG. 4A. The shock absorber 151 has a shock absorber cup 152 with a lip 154 having a seating flange 156 and locking ridge 158 to retain the cup 152 with the cup bottom 160 displaced from the base 148 of the plunger casing 126. Similarly, the poppet member 144 has a base 162 with an enlarged end 164 that seats in the cup 152 with a substantially square flange 166 displaced from the seating flange 156 of the lip 154 of the cup 152. The rounded corners 155 of the flange 166 of the poppet member 144 and the curved side faces 123 of the disk-shaped plunger stop element 118 are sized to slidably engage the inside wall 157 of the high pressure tube 32.

Since the force required to seal the internal passage 138 may be considerable, depending on the transport fluid pressure, the dynamics of displacing the inner magnet disk assembly 28 or poppet plunger results in a substantial momentum that must be dissipated without damage to the cone 146 of the poppet member 144. The flexure of the cup 152 to the plunger case base 148, which acts as a stop, and the contact of the poppet member flange 166 against the cup seating flange 156, which acts as a cushioned stop, absorb the shock of valve closure.

The use of the shock absorber 151 between the poppet member 144 of the plunger or inner magnet disk assembly 28 to cushion the impact of the cone 146 with the valve seat 142 of the conduit assembly 30 substantially improves the cycle life of the magnetic valve unit 10. It is to be understood that a combination shock absorber and poppet member of different configuration may be designed according to the particular specifications of the environment of use including flow rates, fluid pressure, fluid consistency, and other parameters affecting design. This design selection also applies to the materials used in the valve unit where components are in contact with caustic or acidic transport fluids. For most applications stainless steel pressure tubes and fittings are preferred with the poppet member 144 fabricated of a polyether-ether keytone (PEEK™) and the shock absorber cup 152 fabricated from a polytetrafluoroethylene compound (TEFLON™). Housings, casings and other parts not in contact with the transport fluids may be fabricated from aluminum or other high-strength, light-weight material.

Referring now to the perspective view of FIG. 7, the bistable dual-magnet valve unit 10 shown therein is an alternate mountable embodiment 14. In FIG. 7, and in the cross-sectional view of FIG. 8, the elements and components of the valve unit 14 are identical to those of FIGS. 1–6 and are each identified by the same reference numeral except where modified and renumbered as set forth herein.

Figure 8:
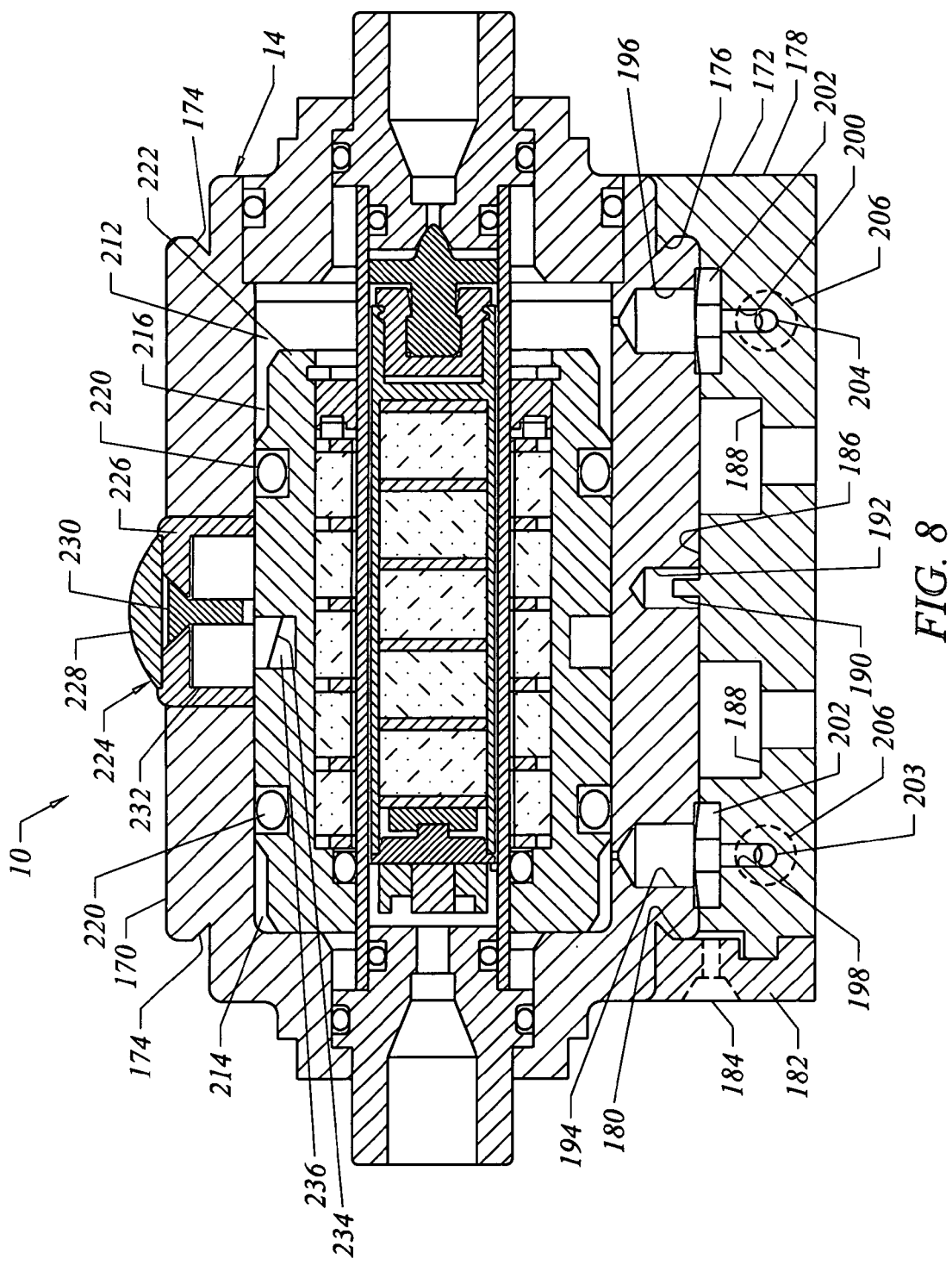
FIG. 8 is a cross-sectional view of the dual-magnet valve unit of FIG. 7.

In FIGS. 7 and 8, a modified outer casing 170 of the valve unit 14 seats in a cradle mount 172. The outer casing 170, as shown in FIG. 8, has circumferential grooves 174 at each end which are engageable by a semi-circular angular ridge 176 on a raised end 178 of the cradle mount 172 and by a similar angular ridge 180 on an end plate 182. The end plate 182 is coupled to the cradle mount 172 by screws 184 (shown in phantom) to clamp the casing 170 to the cradle mount 172.

The cradle mount 172 has a curved bed 186 that is complimentary to the circular casing 170. When the end plate 182 is secured to the cradle mount, the angled ridges 176 and 180 wedge the circular casing 170 firmly to the curved bed 186. The cradle mount is provided with two recessed mounting holes 188 to attach the coupled valve unit 14 to a desired mounting surface.

A location pin 190 projecting from the bed 186 of the cradle mount 172 is positioned into a complimentary locator bore 192 in the casing 170 for properly orienting the outer casing 170 on the bed 186. In this manner, the side entry ports 194 and 196 in the casing 170 are aligned with connecting ports 198 and 200 in the bed 186 of the cradle mount 172. The ports 198 and 200 have seals 202 and communicate with passages 203 and 204 that connect with terminal ports 206 (shown in dotted line). The drive fluid lines thereby connect to the terminal ports at the side of the cradle mount 170. Because of the relocation of the side entry ports 194 and 196 to accommodate the mounting holes and locator pin on the bed, side entry ports 194 and 196 communicate with an annular chamber 212 that is effectively divided into two compartments 214 and 216 by two O-rings 220 on a modified containment housing 222 of the outer magnet ring assembly 24.

The modified dual-magnet valve unit 14 of FIGS. 7 and 8 includes a state indicator 224 for indicating whether the valve unit 14 is in an open or closed state. The indicator 224 is constructed with a shell 226 seated in the modified outer casing 170. The shell 226 has a transparent lens 228 for viewing an indicator 230 projecting from a pivotal cam ring 232. The cam ring has a cam member 234 that engages a central groove 236 in the modified containment housing 222 of the outer magnet ring assembly 24. Linear displacements of the outer magnet ring assembly 24 translate to an 90° angular displacement of the cam ring 232 and indicator 230. The indicator 230 has a suitable marking such as an arrow (not shown) to indicate the state of the valve unit 14. It is to be understood that this feature can be included on the basic unit 12 without the cradle mount by suitable modification.

Figure 9:
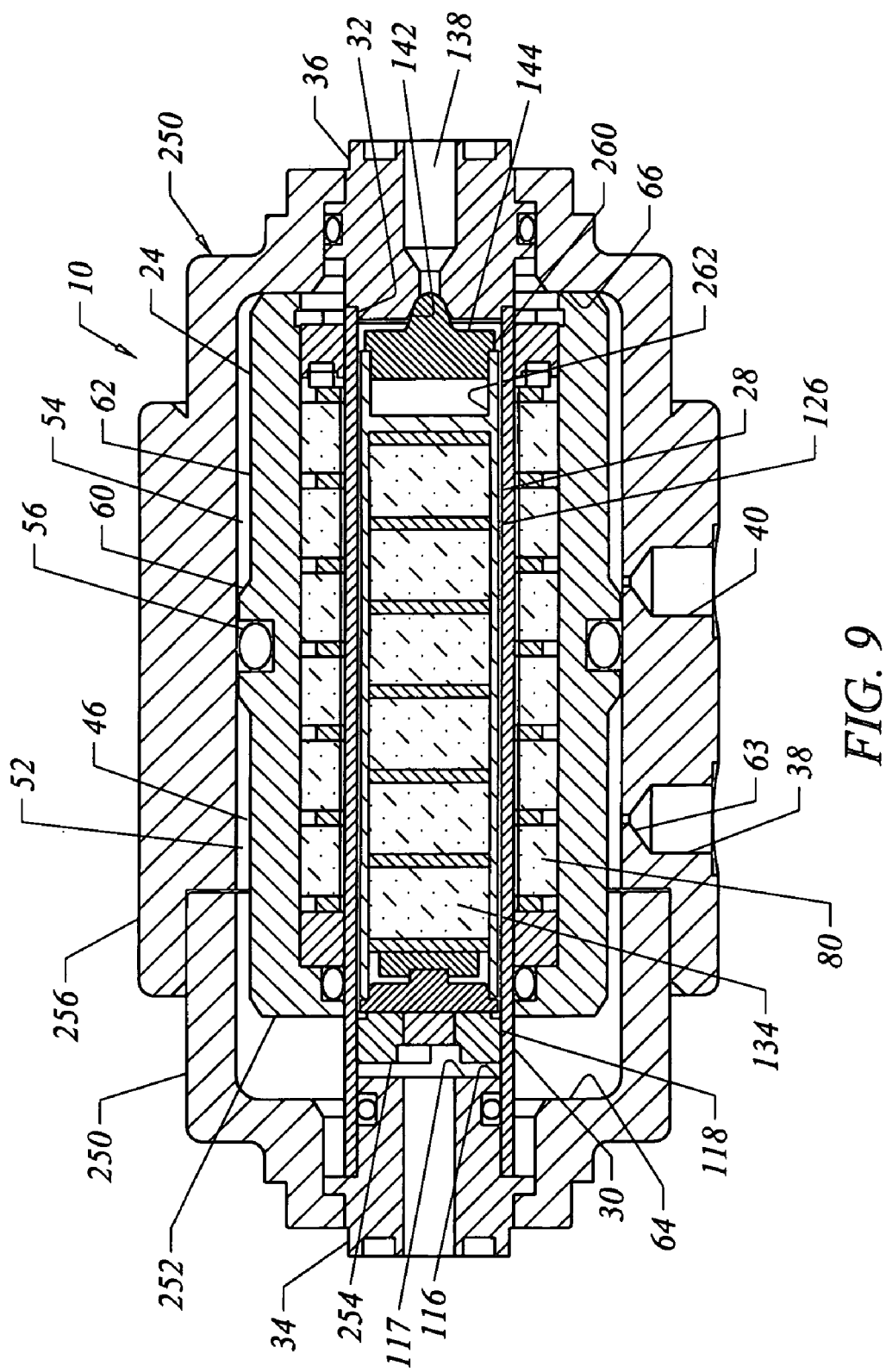
FIG. 9 is a cross-sectioned view of a third embodiment of the dual-magnet valve unit.

Referring to the cross-sectional view of FIG. 9, an alternate embodiment of the dual-magnet unit 10 is shown and identified by the reference numeral 250. The dual-magnet unit 250 utilizes magnetic attraction between the outer first magnet member 252 and a second inner magnet member 254. Although similar in construction to the bistable dual-magnet units 12 and 14 of the previously described embodiments, the dual-magnet unit of FIG. 9 is not inherently bistable, requiring the continuous application of the drive fluid to maintain the full displacement of first outer magnet member for transfer of the magnetic attraction force to the inner magnet member 254. The elements of the dual-magnet unit 250 are substantially the same as the elements of the prior embodiment and common reference numerals are used except for significantly modified structures. Notably, the permanent ring magnets 80 and disk magnets 134 are arranged with their polarity for mutual attraction, as represented by the composition arrows, as contrasted with the mutual repulsion of the units 12 and 14 shown in FIGS. 2 and 8.

As shown in FIG. 9, a modified outer casing 256 and connected end cap 250 house the outer first magnet member 252, the second inner magnet member 254 and the transport fluid conduit assembly 30. The outer first magnet member 252 is in the form of the annular outer magnet ring assembly 24 of FIG. 2 with a casing 62 having a raised seal seat 60 with an O-ring seal 56 to divide the annular chamber 46 into two compartments 52 and 54. Each compartment has an entry port, 38 and 40 with a constructed passage 63 to controal the speed of actuation as previously described.

The outer magnet ring assembly 24 functions as a floating piston between end stops 64 and 66 as noted. However, to maintain the outer magnet ring assembly 24 against a particular end stop, the pressurized drive fluid initiating the displacement to the stop must be maintained. The inner magnet disk assembly 28, with its shorter displacement distance, follows the outer magnet ring assembly 24 and is urged against one of the end fittings 34 and 36. For simplicity, end fittings 36 is welded to the high pressure tube 32 of the transport fluid conduit assembly 30. The opposite end fitting 34 retains the O-ring assembly as previously described to enable disassembly, if necessary. As noted, many of the O-ring, press fit or shrink fit connections can be replaced with premanent assemblies using soldering, brazing or welding.

The end fitting 36 has the internal passage 138 with the flared or conical valve seat 142 axially positioned for contact by the poppet member 144. The poppet member 144 is in the form of a simplified cone 260 which seats in the end socket 262 of the plunger casing 126. Since the inner magnet disk assembly 28 follows displacements of the outer magnet ring assembly 24 and is not translocated in the opposite direction as in the previously described embodiments, the velocity of displacement can be controlled and the shock absorber for the cone 260 is not required.

The inner magnet disk assembly 28 includes the plunger stop element 118; as previously described, which contacts the stop 117 formed by the end face 116 of the end fitting 34.

The pressurized drive fluid is selectively admitted through ports 38 and 40 as previously described. However, while in the previous embodiments the pressure may be pulsed to effect the displacement and then relieved, in the embodiment of FIG. 9, the pressure must be maintained in the selected compartment to maintain the outer magnet ring assembly 24 against one of the stops 64 and 66 to optomize the force of attraction with the inner magnet disk assembly 30.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed:

1. A dual-magnet valve unit comprising:
   a first outer magnet member displaceable between a first position and a second position;
   a second inner magnet member displaceable between a first position and a second position;
   a containment structure wherein the outer magnet member is proximately positioned around the inner magnet member, the magnet members being maintained in substantial repulsion, and, wherein displacement of the first outer magnet member from one of said first and second positions to the other of said first and second positions actuates the opposite displacement of the second inner magnet member from the opposite one of said first and second positions to the other of said first and second positions; and, a transport fluid conduit assembly with a tube located between the outer magnet member and the inner magnet member, wherein the inner magnet member is contained in the tube, the conduit assembly having end fittings with a fluid passage, one of said end fittings having a valve seat wherein the inner magnet member has a poppet member contactable with the valve seat when the inner magnet member is displaced against the end fitting having the valve seat, the other of said end fittings having an internal stop wherein the inner magnet member has a stop element contactable with the internal stop when the inner magnet member is displaced against the end fitting having the internal stop, the internal stop of the fitting and stop element of the inner magnet member being constructed with a bypass to pass fluid through the passage and tube when the stop element contacts the internal stop, and, wherein the tube has opposite ends and the end fittings are connected to the opposite ends of the tube;

wherein the containment structure and transport fluid conduit assembly form a chamber in which the first outer magnet member is displaceable, the chamber being divided into a first compartment and a second compartment, each compartment having an entry port in the containment structure for a drive fluid, wherein on supply of drive fluid to a selected compartment through the port in the containment structure, the outer magnet member is displaced to one of said first and second positions, and on supply of drive fluid to the other of said compartments the outer magnet member is displaced to the other of said first and second positions; and, wherein the first outer magnet member comprises an annular magnet ring assembly with a casing and a series of ring poles and ring magnets contained in the casing, the annular magnet ring assembly being displaceable on the tube of the fluid conduit assembly, wherein the second inner magnet member comprises a cylindrical magnet disk assembly with a casing and a series of disk poles and disk magnets contained in the casing, the cylindrical magnet disk assembly being displaceable in the tube of the transport fluid conduit, and wherein the ring poles have radial ears for facilitating assembly in the annular casing and improving the magnetic flux directed at the cylindrical magnet disk assembly.

2. The dual-magnet valve unit of claim 1 wherein the casing of the first outer magnet member has sealing means for dividing the chamber into the first compartment and the second compartment.

3. The dual-magnet valve unit of claim 2 wherein the containment structure comprises an outer casing and the outer casing has indicator means engaging the casing of the first outer magnet member for indicating whether the valve unit is in an open or closed state.

4. The dual-magnet valve unit of claim 1 in combination with a cradle mount having ports for connection of drive fluid lines, the cradle mount being mountable to an external structure.

5. The dual-magnet valve unit of claim 1 wherein each entry port has a constricted passage sized to control the speed of actuation.

6. A dual-magnet valve unit comprising:

a first outer magnet member displaceable between a first position and a second position;

a second inner magnet member displaceable between a first position and a second position;

a containment structure wherein the outer magnet member is proximately positioned around the inner magnet member, the magnet members being maintained in substantial attraction, and, wherein displacement of the first outer magnet member from one of said first and second positions to the other of said first and second positions actuates the following displacement of the second inner magnet member from one of said first and second positions to the other of said first and second positions; and, a transport fluid conduit assembly with a tube located between the outer magnet member and the inner magnet member, wherein the inner magnet member is contained in the tube, the conduit assembly having end fittings with a fluid passage, one of said end fittings having a valve seat wherein the inner magnet member has a poppet member contactable with the valve seat when the inner magnet member is displaced against the end fitting having the valve seat, the other of said end fittings having an internal stop wherein the inner magnet member has a stop element contactable with the internal stop when the inner magnet member is displaced against the end fitting having the internal stop, the internal stop of the fitting and stop element of the inner magnet member being constructed with a bypass to pass fluid through the passage and tube when the stop element contacts the internal stop, and, wherein the tube has opposite ends and the end fittings are connected to the opposite ends of the tube;

wherein the containment structure and transport fluid conduit assembly form a chamber in which the first outer magnet member is dis placeable, the chamber being divided into a first compartment and a second compartment, each compartment having an entry port in the containment structure for a drive fluid, wherein on supply of drive fluid to a selected compartment through the port in the containment structure, the outer magnet member is displaced to one of said first and second positions, and on supply of drive fluid to the other of said compartments the outer magnet member is displaced to the other of said first and second position; and, wherein the first outer magnet member comprises an annular magnet ring assembly with a casing and a series of ring poles and ring magnets contained in the casing, the annular magnet ring assembly being displaceable on the tube of the fluid conduit assembly, wherein the second inner magnet member comprises a cylindrical magnet disk assembly with a casing and a series of disk poles and disk magnets contained in the casing, the cylindrical magnet disk assembly being displaceable in the tube of the transport fluid conduit, and wherein the ring poles have radial ears for facilitating assembly in the annular casing and improving the magnetic flux directed at the cylindrical magnet disk assembly.

7. The dual-magnet valve unit of claim 6 wherein the casing of the first outer magnet member has sealing means for dividing the chamber into the first compartment and the second compartment.

8. The dual-magnet valve unit of claim 6 in combination with a cradle mount having ports for connection of drive fluid lines, the cradle mount being mountable to an external structure.

9. The dual-magnet valve unit of claim 6 wherein each entry port has a constricted passage sized to control the speed of actuation.

10. A dual-magnet valve unit comprising:
a first outer magnet member displaceable between a first position and a second position;
a second inner magnet member displaceable between a first position and a second position;
a containment structure wherein the outer magnet member is proximately positioned around the inner magnet member, the magnet members being maintained in substantial repulsion, and, wherein displacement of the first outer magnet member from one of said first and second positions to the other of said first and second positions actuates the opposite displacement of the second inner magnet member from the opposite one of said first and second positions to the other of said first and second positions; and,
a transport fluid conduit assembly with a tube located between the outer magnet member and the inner magnet member, wherein the inner magnet member is contained in the tube, the conduit assembly having end fittings with a fluid passage, one of said end fittings having a valve seat wherein the inner magnet member has a poppet member contactable with the valve seat when the inner magnet member is displaced against the end fitting having the valve seat, the other of said end fittings having an internal stop wherein the inner magnet member has a stop element contactable with the internal stop when the inner magnet member is displaced against the end fitting having the internal stop, the internal stop of the fitting and stop element of the inner magnet member being constructed with a bypass to pass fluid through the passage and tube when the stop element contacts the internal stop, and, wherein the tube has opposite ends and the end fittings are connected to the opposite ends of the tube;
wherein the inner magnet member has a shock absorber engaging the poppet member, the shock absorber absorbing the impact of the poppet member when contacting the valve seat on closure of the valve.

11. The dual-magnet valve unit of claim 10 wherein the first outer magnet member comprises an annular magnet ring assembly with a casing and a series of ring poles and ring magnets contained in the casing, the annular magnet ring assembly being displaceable on the tube of the fluid conduit assembly, and wherein the second inner magnet member comprises a cylindrical magnet disk assembly with a casing and a series of disk poles and disk magnets contained in the casing, the cylindrical magnet disk assembly being displaceable in the tube of the fluid conduit.

12. The dual-magnet valve unit of claim 11 wherein the ring poles have radial ears for facilitating assembly in the annular casing and improving the magnetic flux directed at the cylindrical magnet disk assembly.

13. The dual-magnet valve unit of claim 11 wherein the casing of the second inner magnet member includes a socket with a shock absorber cup and the poppet member has a base seatable in the shock absorber cup, the poppet member having a cone that contacts the valve seat on closure of the valve unit.

14. The dual-magnet valve unit of claim 11 wherein the containment structure and transport fluid conduit assembly form a chamber in which the first outer magnet member is displaceable, the chamber being divided into a first compartment and a second compartment, each compartment having an entry port in the containment structure for a drive fluid, wherein on supply of drive fluid to a selected compartment through the port in the containment structure, the outer magnet member is displaced to one of said first and second positions, and on supply of drive fluid to the other of said compartments the outer magnet member is displaced to the other of said first and second positions.

15. The dual-magnet valve unit of claim 14 wherein the casing of the first outer magnet member has sealing means for dividing the chamber into the first compartment and the second compartment.

16. The dual-magnet valve unit of claim 14 wherein each entry port has a constricted passage sized to control the speed of actuation.

* * * * *